US007717378B2

(12) United States Patent
Yu

(10) Patent No.: US 7,717,378 B2

(45) Date of Patent: May 18, 2010

(54) SAXOPHONE-SUPPORTING STAND

(76) Inventor: Tsung Yao Yu, No. 93, Sec. 3, Minsheng Rd., Daya Township, Taichung County (TW) 428

( * ) Notice: Subject to any disclaimer, the term of this patent is extended or adjusted under 35 U.S.C. 154(b) by 0 days.

(21) Appl. No.: 12/284,375

(22) Filed: Sep. 22, 2008

(65) Prior Publication Data

US 2010/0072332 A1 Mar. 25, 2010

(51) Int. Cl.
*F16M 11/38* (2006.01)

(52) U.S. Cl. ....................... 248/166; 84/327; 248/176.1

(58) Field of Classification Search ................. 248/166, 248/164, 173, 171, 188.6, 447, 460, 528; 42/94

See application file for complete search history.

(56) References Cited

U.S. PATENT DOCUMENTS

| | | | | | |
|---|---|---|---|---|---|
| 956,399 | A * | 4/1910 | Morse | ......................... | 211/85 |
| 2,522,345 | A * | 9/1950 | Cashiopp | .................... | 248/121 |
| 3,057,591 | A * | 10/1962 | Weimer | ...................... | 248/166 |
| 5,029,796 | A * | 7/1991 | Schoenig | .................... | 248/443 |
| 5,957,417 | A * | 9/1999 | Yu | ............................ | 248/166 |
| 6,017,012 | A * | 1/2000 | Henson, Jr. | ................. | 248/460 |
| 6,585,199 | B1 * | 7/2003 | Yu | ............................ | 248/166 |
| 6,772,981 | B1 * | 8/2004 | Yu | .......................... | 248/122.1 |
| 7,074,993 | B1 * | 7/2006 | Hsieh | .......................... | 84/327 |
| D557,329 | S * | 12/2007 | Lippert | ........................ | D17/20 |
| 2002/0070319 | A1 * | 6/2002 | Yu | .......................... | 248/122.1 |

* cited by examiner

*Primary Examiner*—Amy J Sterling
(74) *Attorney, Agent, or Firm*—Charles E. Baxley

(57) ABSTRACT

Disclosed is a saxophone-supporting stand including two legs and a connective apparatus. The legs can be open and closed. The connective apparatus is used to keep the legs open. The connective apparatus includes a first link, a second link and two rods. The first link includes a first end pivotally connected to one of the legs and a second end. The second link includes a first end pivotally connected to the other leg and a second end pivotally connected to the second end of the first link so that the first and second links are open when the legs are open. Each of the rods is obliquely raised from a related one of the first and second links so that the rods form a V-shaped structure for supporting a portion of the saxophone when the first and second links are open.

1 Claim, 12 Drawing Sheets

SAXOPHONE-SUPPORTING STAND

FIELD OF INVENTION

The present invention relates to a stand for supporting a saxophone and, more particularly, to a connector for interconnecting two legs of a stand to keep the legs open.

BACKGROUND OF INVENTION

Referring to FIGS. 1 and 2, there is shown a conventional stand for supporting a saxophone 15. The stand includes a base 11, a post formed on the base 11, an inclined rod 12 formed on the post, a clip 13 attached to the inclined rod 12 and an inverted yoke 14 attached to the inclined rod 12. The clip 13 includes two prongs 16. The bell of the saxophone 15 is clipped with the clip 13. Another portion of the saxophone 15 is supported on the inverted yoke 14. The stand is robust. However, the stand is bulky when it is not in use because it is not collapsible.

Referring to FIG. 3, another conventional stand is shown. The stand includes a tripod 20, a clip 23 and an inverted yoke 30. The tripod 20 includes three legs 26 each including a lower end for contact the ground or a floor, a middle point pivotally connected to a lower ring securely provided around a post 22 and an upper end pivotally connected to an upper ring movably provided around the post 22. A threaded bolt 21 is inserted through the upper ring. The tip of the threaded bolt 21 can be abutted against the post 22 to position the upper ring on the post 22 and hence keep the legs 26 open. The clip 23 includes a U-shaped portion formed on a rod. The U-shaped portion is used to clip the bell of the saxophone 15. The rod is inserted in the post 22. A ferrule and threaded bolt 25 is used to position the rod of the clip 23 on the post 22. A yoke 31 is attached to the inverted yoke 30. A boss 32 is attached to the yoke 31. The yoke 31 is mounted on one of the legs 26 while the boss 32 is disposed in a selected one of three dents 27 made in the leg 26. However, the mounting of the yoke 31 on the leg 26 is not reliable since the insertion of the boss 32 in the dents 27 is not firm.

Referring to FIG. 4, there is shown modification of the stand shown in FIG. 3. The yoke 31 includes two prongs 33 each formed with a tip for insertion in a groove 34 defined in one of the legs 26.

The present invention is therefore intended to obviate or at least alleviate the problems encountered in prior art.

SUMMARY OF INVENTION

It is the primary objective of the present invention to provide a collapsible stand for a saxophone.

To achieve the foregoing objective, the stand includes two legs and a connective apparatus. The legs can be open and closed. The connective apparatus is used to keep the legs open. The connective apparatus includes a first link, a second link and two rods. The first link includes a first end pivotally connected to one of the legs and a second end. The second link includes a first end pivotally connected to the other leg and a second end pivotally connected to the second end of the first link so that the first and second links are open when the legs are open. Each of the rods is obliquely raised from a related one of the first and second links so that the rods form a V-shaped structure for supporting a portion of the saxophone when the first and second links are open.

Other objectives, advantages and features of the present invention will become apparent from the following description referring to the attached drawings.

BRIEF DESCRIPTION OF DRAWINGS

The present invention will be described via detailed illustration of two embodiments versus the prior art referring to the drawings.

DETAILED DESCRIPTION OF EMBODIMENTS

Figure 6:
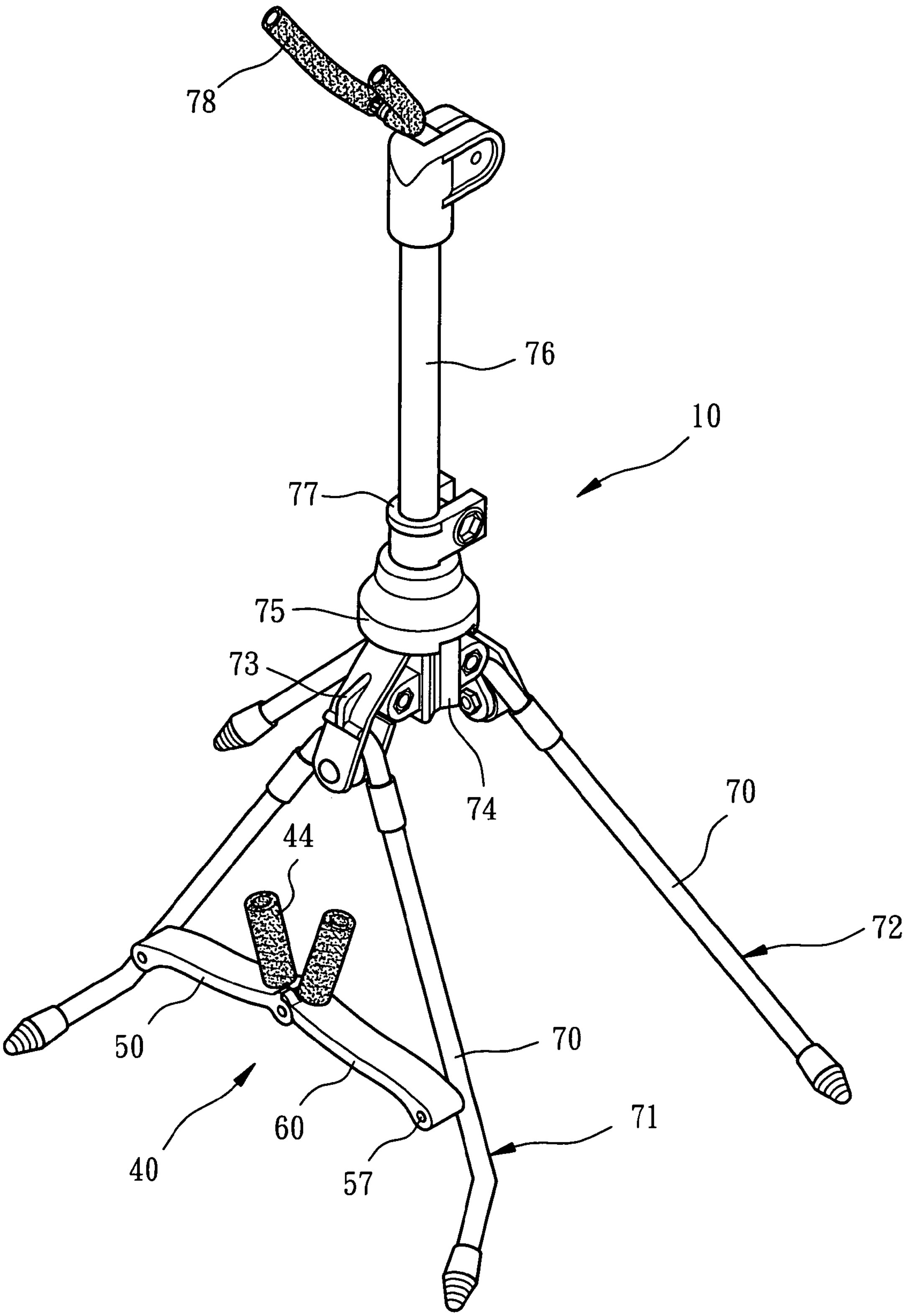
FIG. 6 is a perspective view of a stand using the connective apparatus shown in FIG. 5.
Figure 13:
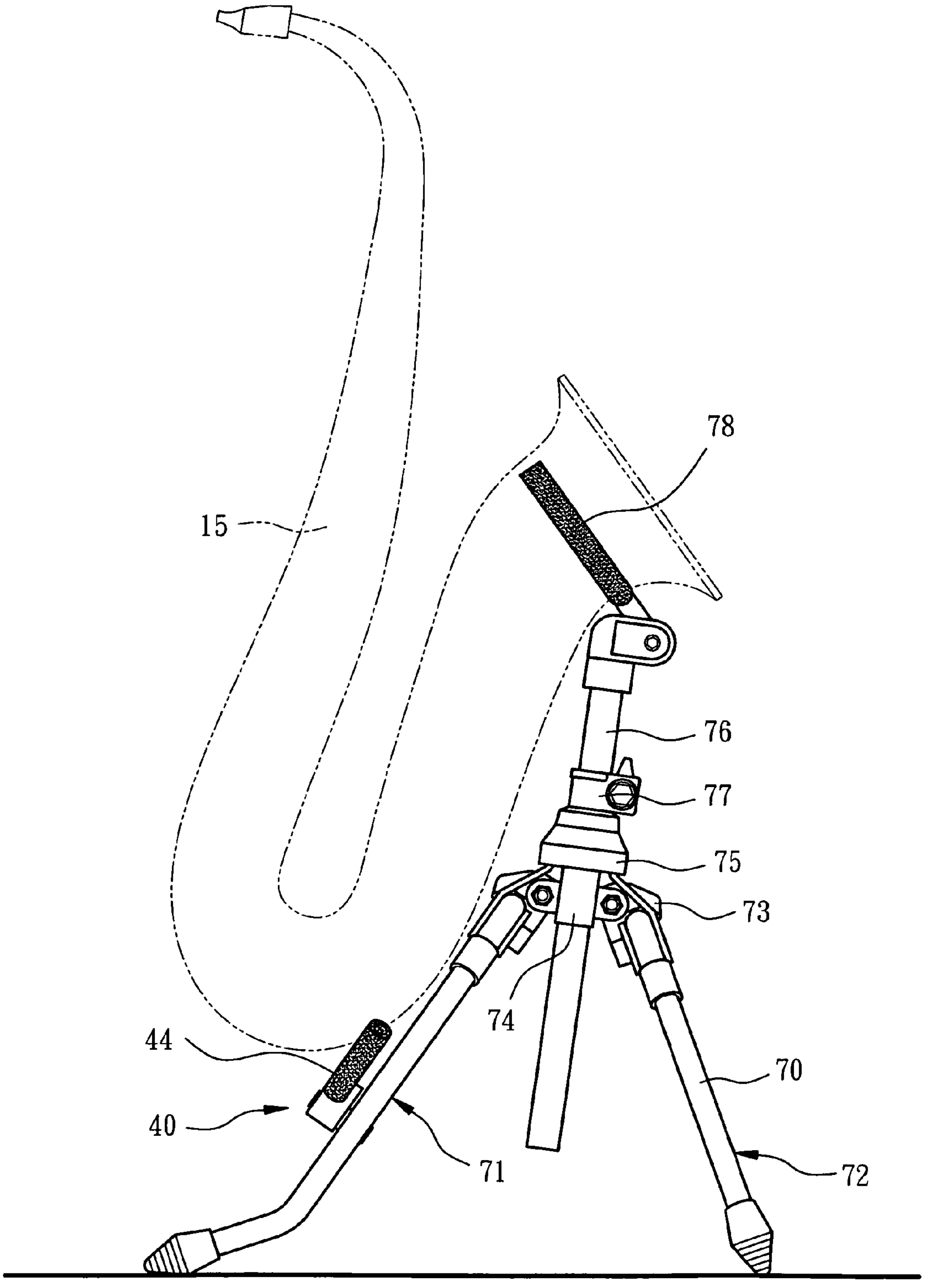
FIG. 13 is side view of a saxophone supported on the stand shown in FIG. 11.

Referring to FIG. 6, a stand 10 is equipped with a connective apparatus 40 according to a first embodiment of the present invention. The stand 10 includes two pairs 71 and 72 of legs 70. In each pair, the legs 70 are pivotally connected to an adjusting element 73 connected to a central element 74. A post 76 is raised from the central element 74. A ring 75 is engaged with the central element 74 to restrain the adjusting elements 73 and hence position the pairs 71 and 72. The position of the post 76 relative to the central element 74 is retained with a clamp 77. A clip 78 is provided on the post 76. The clip 78 is used to clip the bell of a saxophone 15 (FIG. 13). The connective apparatus 40 is used to interconnect the legs 70 of the pair 71 to keep them open.

Figure 1:
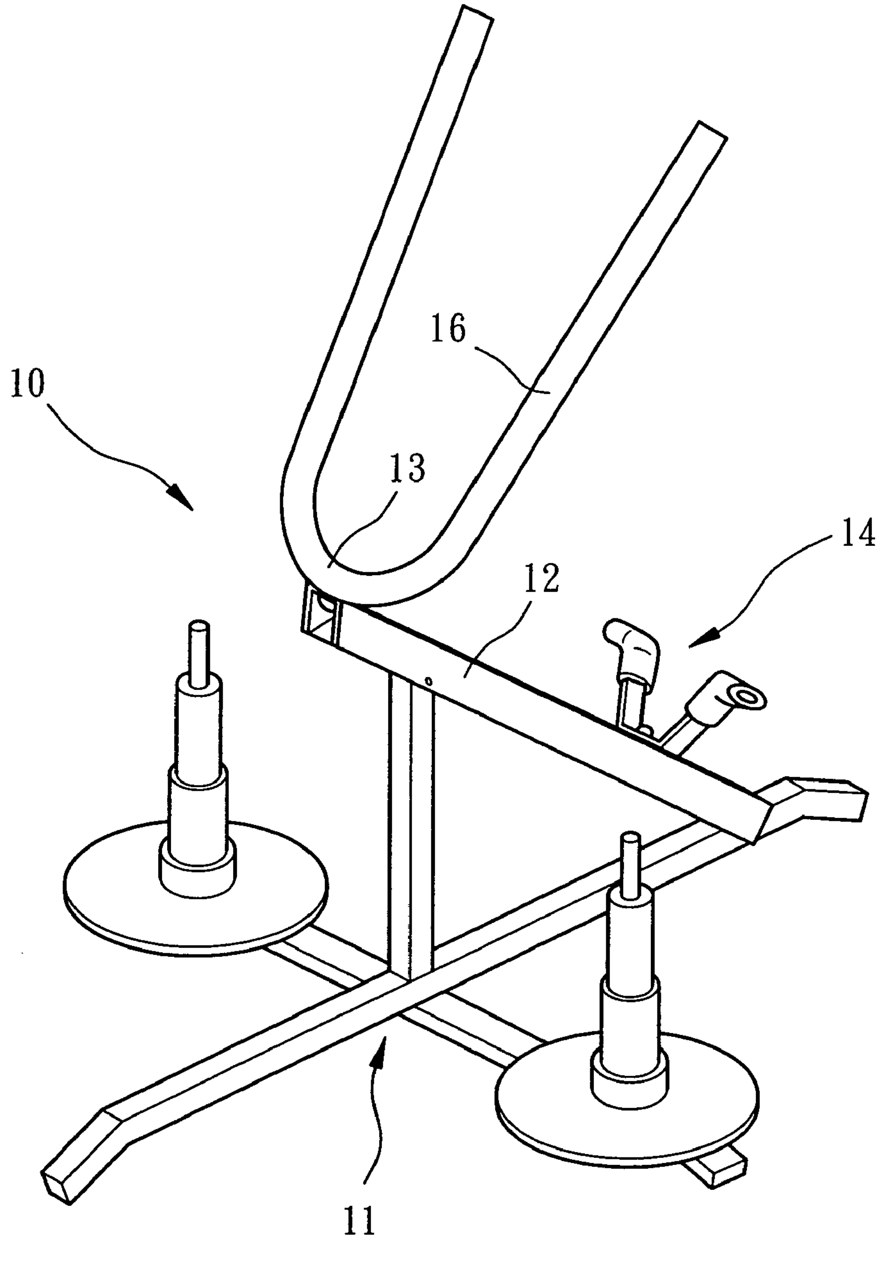
FIG. 1 PRIOR ART
FIG. 1 is a perspective view of a conventional stand.
Figure 2:
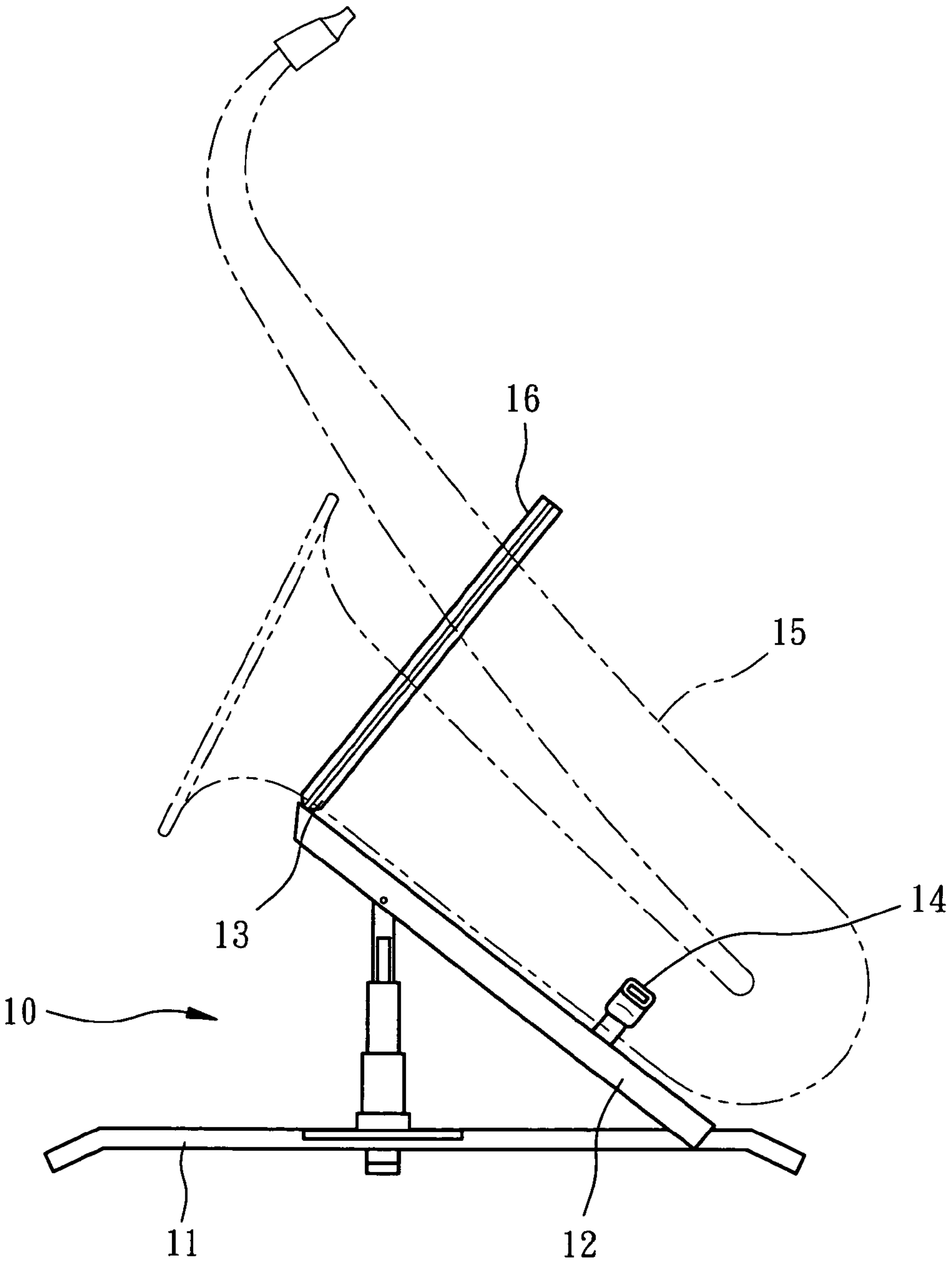
F I G . 2 PRIOR ART
FIG. 2 is a side view of the conventional stand shown in FIG. 1.
Figure 3:
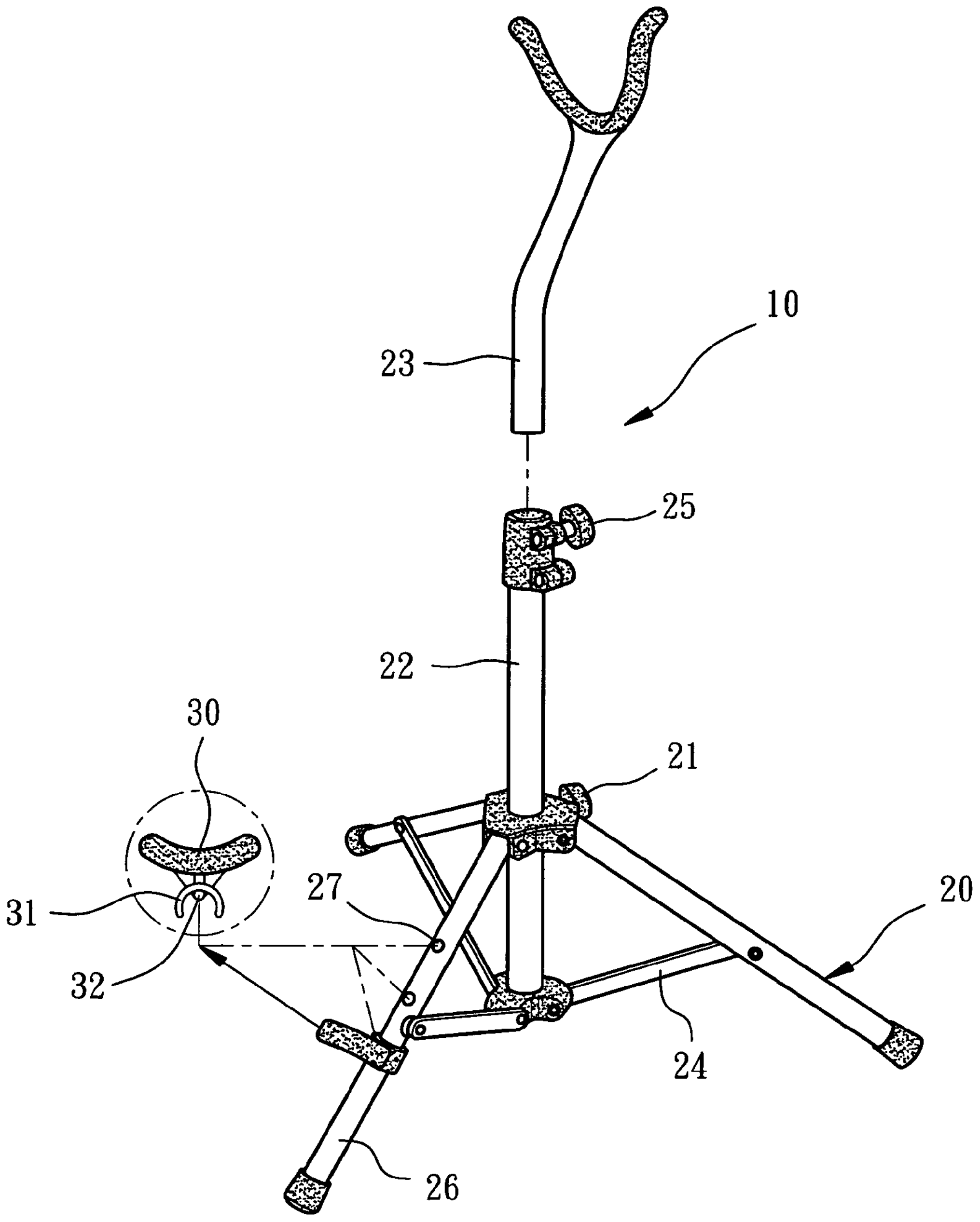
F I G . 3 PRIOR ART
FIG. 3 is an exploded view of another conventional stand.
Figure 4:
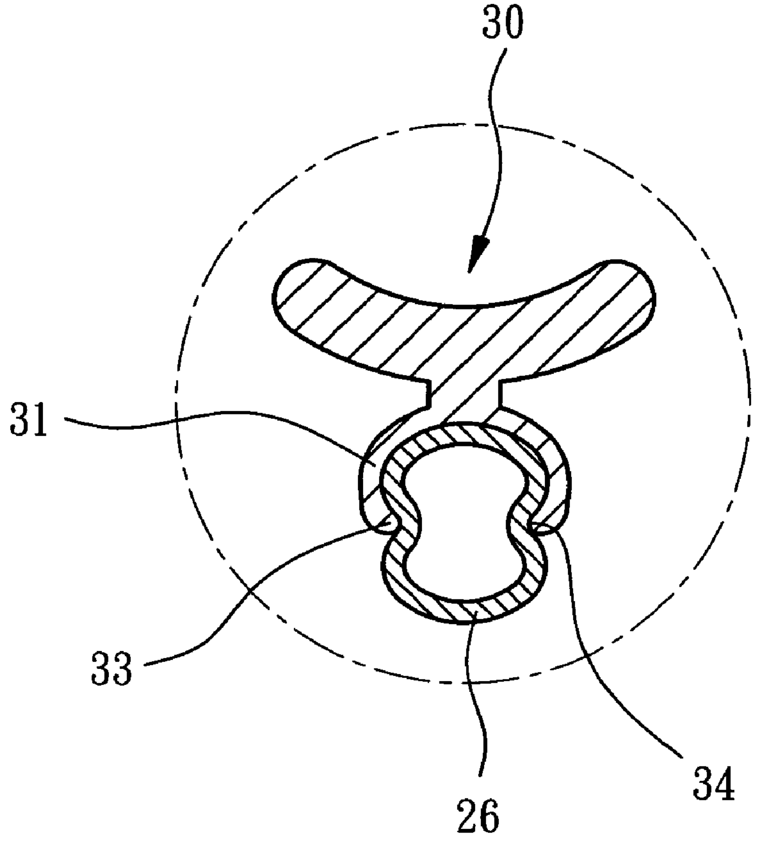
F I G . 4 PRIOR ART
FIG. 4 is a partial cross-sectional view of another conventional stand.
Figure 5:
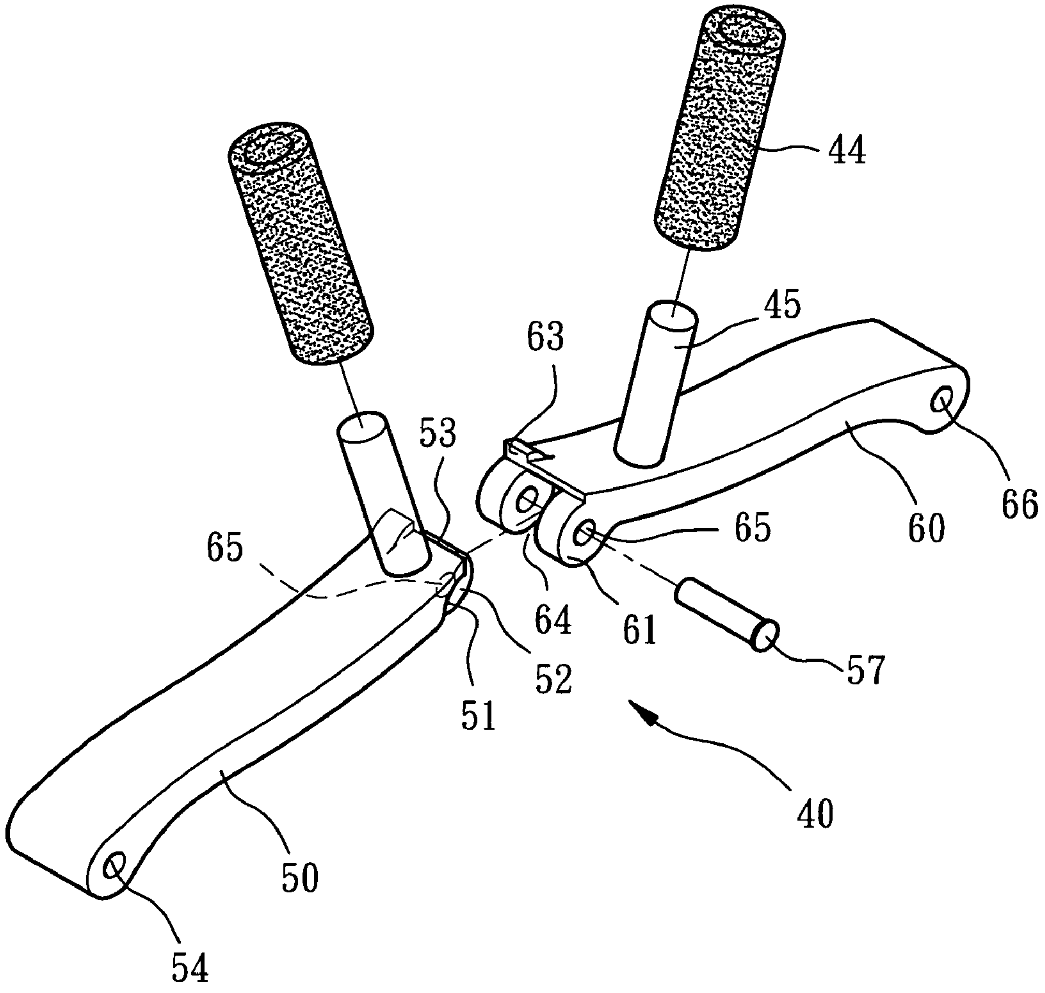
FIG. 5 is an exploded view of a connective apparatus for a stand according to the first embodiment of the present invention.

Referring to FIG. 5, the connective apparatus 40 includes a first link 50, a second link 60 and a rivet 57 for pivotally interconnecting the links 50 and 60. The first link 50 includes two recesses 51 defined in a first end, an ear 52 formed at the first end between the recesses 51 and a tunnel 54 defined in a second end. The ear 52 includes an aperture 65 defined therein. The first end of the first link 50 is formed with a contact face 53. A rod 45 is obliquely provided on the first link 50. A flexible sheath 44 is provided around the rod 45.

The second link 60 includes two ears 61 formed at a first end and a recess 64 defined in the first end between the ears 61 and a tunnel 66 defined in a second end. Each of the ears 61 includes an aperture 65 defined therein. The first end of the second link 60 is formed with a contact face 63. Another rod 45 is obliquely provided on the second link 60. Another flexible sheath 44 is provided around the rod 45 on the second link 60.

Figure 7:
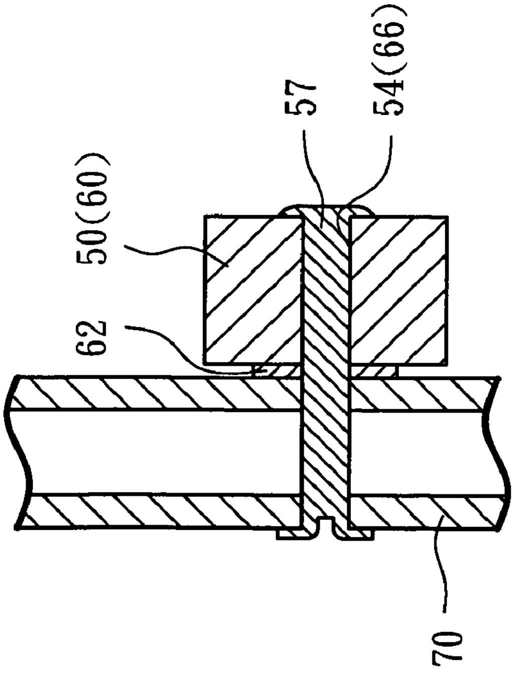
FIG. 7 is a partial cross-sectional view of the stand shown in FIG. 6.

Referring to FIG. 7, a rivet 57 is driven into one of the legs 70 through the tunnel 54 to pivotally connect the first link 50 to the leg 70. A washer 62 may be provided between the first link 50 and the leg 70 to reduce the friction. Another rivet 57 is driven into another one of the legs 70 through the tunnel 66 to pivotally connect the second link 60 to the leg 70. A washer 62 may be provided between the second link 60 and the leg 70 to reduce the friction.

Figure 8:
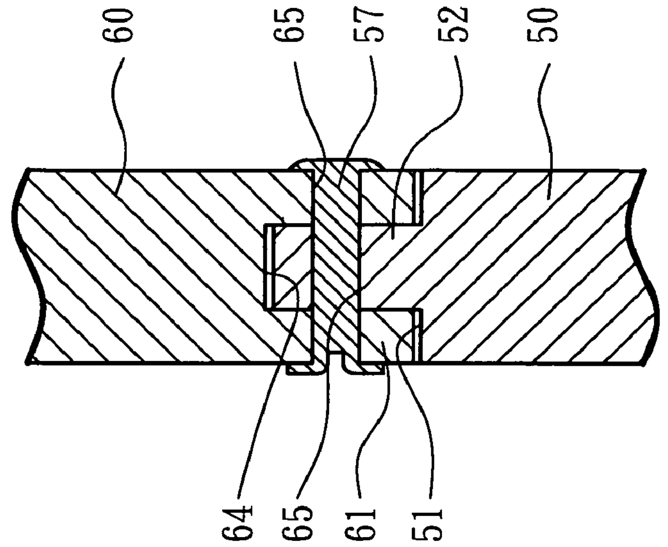
FIG. 8 is another partial cross-sectional view of the stand shown in FIG. 6.

Referring to FIG. 8, a rivet 57 is driven into the apertures 65 to pivotally connect the first link 50 to the second link 60.

Referring to FIG. 6, the legs 70 are open while the connective apparatus 40 is extended, i.e., the links 50 and 60 are open. The contact face 53 is abutted against the contact face 63, thus keeping the links 50 and 60 open and, hence, the legs 70 open. The rods 44 are used to support another portion of the saxophone 15.

Figure 9:
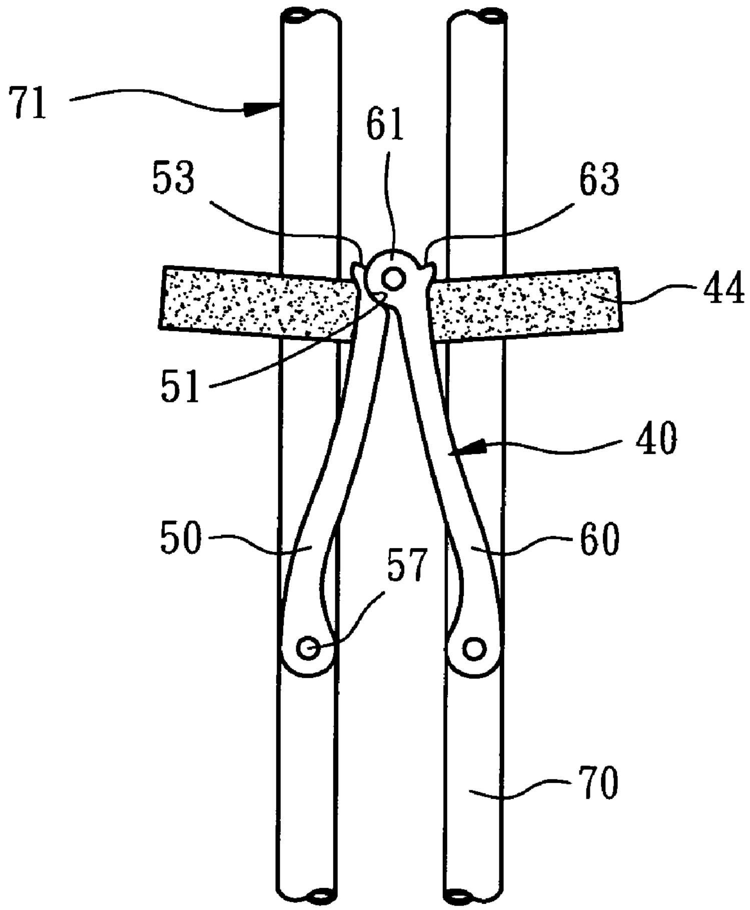
FIG. 9 is a partial side view of the stand shown in FIG. 6.

Referring to FIG. 9, the legs 70 are closed while the connective apparatus 40 is folded, i.e., the links 50 and 60 are closed.

Figure 10:
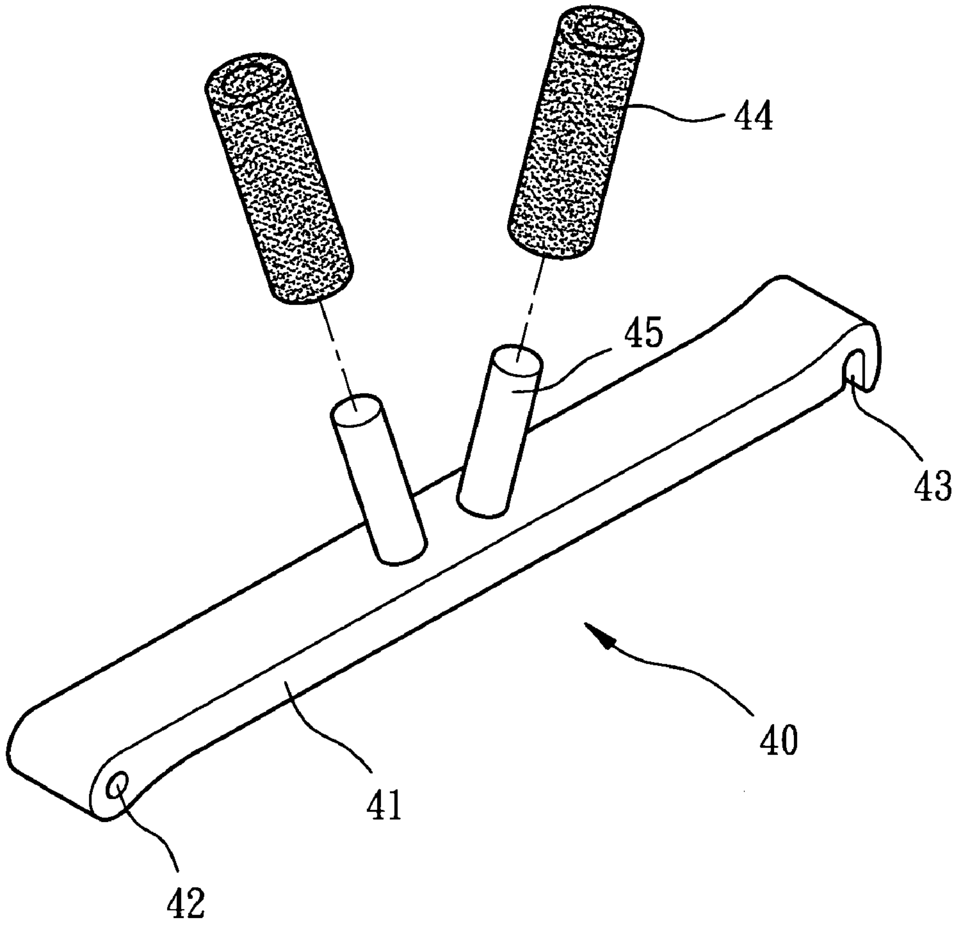
FIG. 10 is an exploded view of a connective apparatus according to the second embodiment of the present invention.

Referring to FIG. 10, a connective apparatus includes a latch 41, two rods 45 obliquely raised from the latch 41 and two flexible sheaths 44 each provided around a related one of the rods 45 according to a second embodiment of the present invention. The latch 41 includes a tunnel 42 defined in a first end and a recess 43 defined in a second end.

Figure 11:
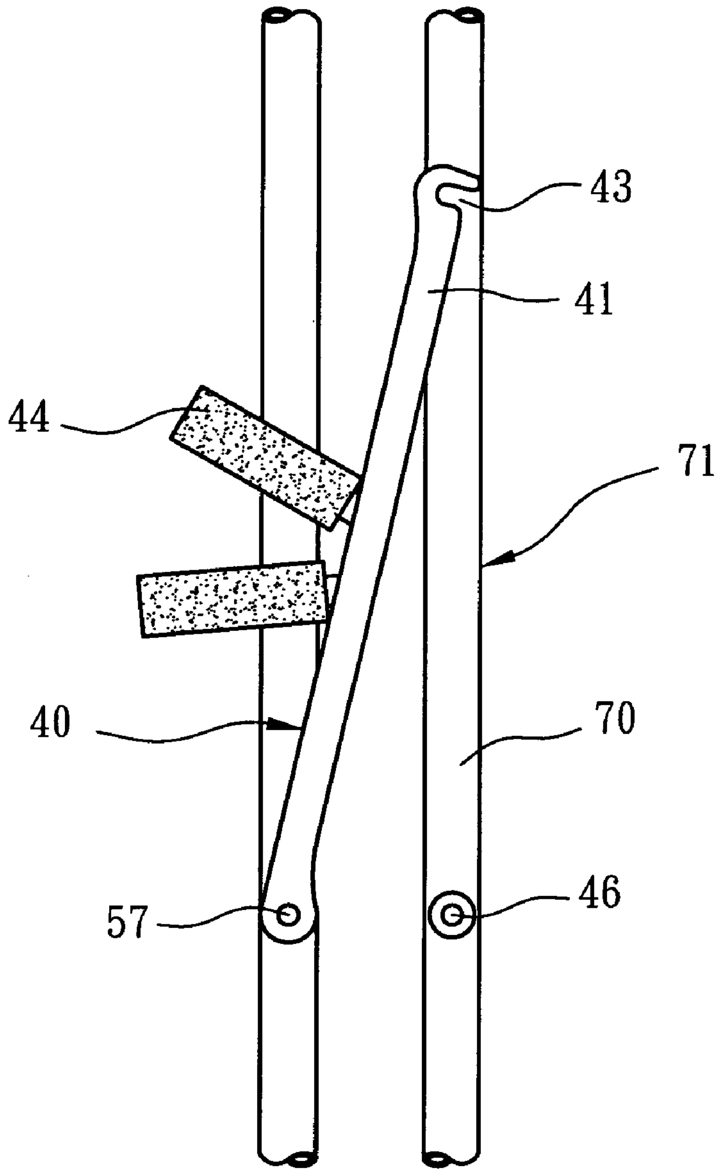
FIG. 11 is a partial side view of a stand using the connective apparatus shown in FIG. 10.

Referring to FIG. 11, the legs 70 are closed. A rivet 57 is driven into one of the legs 70 through the tunnel 42 to pivotally connect the latch 41 to the leg 70. A stem 46 is provided on the other leg 70 by welding, molding or a thread for example.

Figure 12:
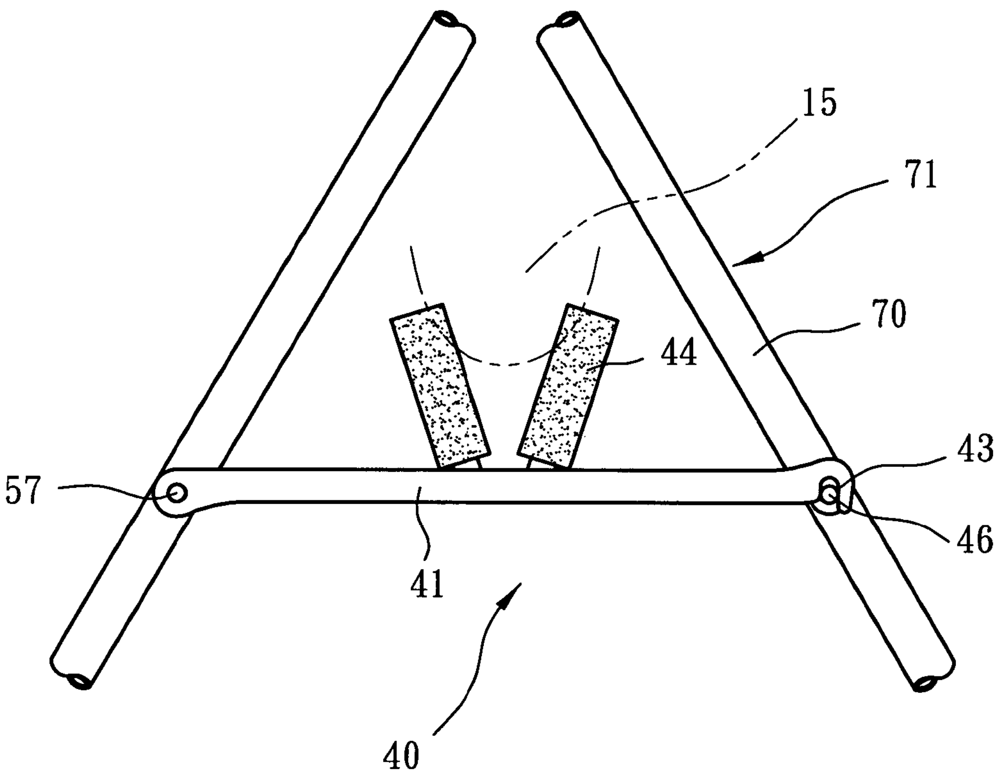
FIG. 12 is a partial side view of the stand in another position than shown in FIG. 11.

Referring to FIG. 12, the legs 70 are open. The second end of the latch 41 is laid on the pin 46 so that the recess 43 receives the pin 46, to keep the legs 70 open.

Referring to FIG. 13, the connective apparatus is used in the stand. The bell of the saxophone 15 is clipped with the clip 78. Another portion of the saxophone 15 is supported on the rods 44. Hence, the saxophone 15 is supported on the stand.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A saxophone-supporting stand comprising:

two legs that can be open and closed; and a connective apparatus for keeping the legs open, the connective apparatus comprising:

a first link comprising a first end pivotally connected to one of the legs and a second end, the first link comprising an ear and a contact surface respectively formed at the second end thereof;

a second link comprising a first end pivotally connected to the other leg and a second pivotally connected to the second end of the first link so that the first and second links are open when the legs are open, the second link comprising two ears formed at the second end thereof, the ear of the first link sandwiched between the ears of the second link, wherein a rivet is driven through the ears to pivotally connected the first link to the second link, the second link comprising a contact surface formed at the second end thereof for abutment against the contact surface of the first link to keep the first and second links open;

a washer provided between each of the first and second links and a related one of the legs;

two rods each obliquely raised from a related one of the first and second links so that the rods form a V-shaped structure for supporting a portion of the saxophone when the first and second links are open; and two flexible sheaths provided around the rods.

* * * * *